(12) United States Patent
Chappell et al.

(10) Patent No.: US 11,851,169 B2
(45) Date of Patent: Dec. 26, 2023

(54) SHOCK ABSORBING STRUT

(71) Applicant: SAFRAN LANDING SYSTEMS, Velizy-Villacoublay (FR)

(72) Inventors: Robert Chappell, Whitby (CA); Randy Lee, Oshawa (CA); Peter Pisters, Ajax (CA); Michael Saccoccia, Seagrave (CA)

(73) Assignee: SAFRAN LANDING SYSTEMS

( * ) Notice: Subject to any disclaimer, the term of this patent is extended or adjusted under 35 U.S.C. 154(b) by 456 days.

(21) Appl. No.: 16/523,777

(22) Filed: Jul. 26, 2019

(65) Prior Publication Data
US 2021/0024203 A1    Jan. 28, 2021

(51) Int. Cl.
B64C 25/60 (2006.01)
F16F 13/00 (2006.01)
B64C 25/10 (2006.01)

(52) U.S. Cl.
CPC ............ *B64C 25/60* (2013.01); *F16F 13/002* (2013.01); *B64C 25/10* (2013.01); *F16F 2224/04* (2013.01); *F16F 2230/06* (2013.01)

(58) Field of Classification Search
CPC .. F16F 2224/04; F16F 2230/06; F16F 13/002; B64C 25/10; B64C 25/60
See application file for complete search history.

(56) References Cited

U.S. PATENT DOCUMENTS

| | | | | |
|---|---|---|---|---|
| 2,471,294 A * | 5/1949 | Watts | ...................... | B64C 25/60 267/64.26 |
| 2,724,590 A * | 11/1955 | Irwin | ...................... | F16F 9/486 267/64.22 |
| 4,291,850 A * | 9/1981 | Sharples | ................. | B60G 17/04 244/102 SS |
| 4,746,086 A * | 5/1988 | Happ | ...................... | B64C 25/60 244/104 R |
| 8,695,764 B2 * | 4/2014 | Luce | ........................ | B64C 25/60 188/269 |
| 8,727,273 B2 * | 5/2014 | Luce | ........................ | B64C 25/26 244/102 SL |
| 9,914,532 B2 | 3/2018 | Schmidt | | |

(Continued)

FOREIGN PATENT DOCUMENTS

CA    2931490 A1 * 12/2016 ............ F16F 9/3292
CN    203257430 U  * 10/2013

(Continued)

OTHER PUBLICATIONS

International Search Report and Written Opinion of the International Searching Authority dated Nov. 17, 2020, issued in corresponding International Application No. PCT/IB2020/057067, filed Jul. 27, 2020, 13 pages.

*Primary Examiner* — Melody M Burch
(74) *Attorney, Agent, or Firm* — Christensen O'Connor Johnson Kindness PLLC

(57) ABSTRACT

A shock strut is provided that includes a first energy absorption stage or load limiter and a second energy absorption stage or load limiter. The second energy absorption stage or load limiter can include one or more disc springs. The shock strut can be employed on both fixed and retractable landing gear alike, while providing design adjustability for obtaining load-deflection curves that accommodate a range of descent or impact velocities.

10 Claims, 10 Drawing Sheets

(56) References Cited

U.S. PATENT DOCUMENTS

| | | | |
|---|---|---|---|
| 2006/0151927 A1* | 7/2006 | Jyr | F16F 9/061 |
| | | | 267/124 |
| 2006/0220918 A1 | 10/2006 | Stockwell et al. | |
| 2010/0219290 A1* | 9/2010 | Luce | B64C 25/14 |
| | | | 244/102 SL |
| 2011/0133378 A1 | 6/2011 | Dunn | |
| 2015/0075361 A1 | 3/2015 | Moretti et al. | |

FOREIGN PATENT DOCUMENTS

| | | | |
|---|---|---|---|
| DE | 6944199 U | 4/1970 | |
| DE | 202004015690 U1 | 12/2004 | |
| DE | 102012223476 A1 | 6/2014 | |
| EP | 0614804 A1 | 9/1994 | |
| EP | 3287365 A1 * | 2/2018 | B64C 25/10 |
| GB | 806824 A * | 12/1958 | B64C 25/60 |
| GB | 2176572 A * | 12/1986 | F16F 9/56 |
| GB | 2311356 A * | 9/1997 | B60G 15/066 |

\* cited by examiner

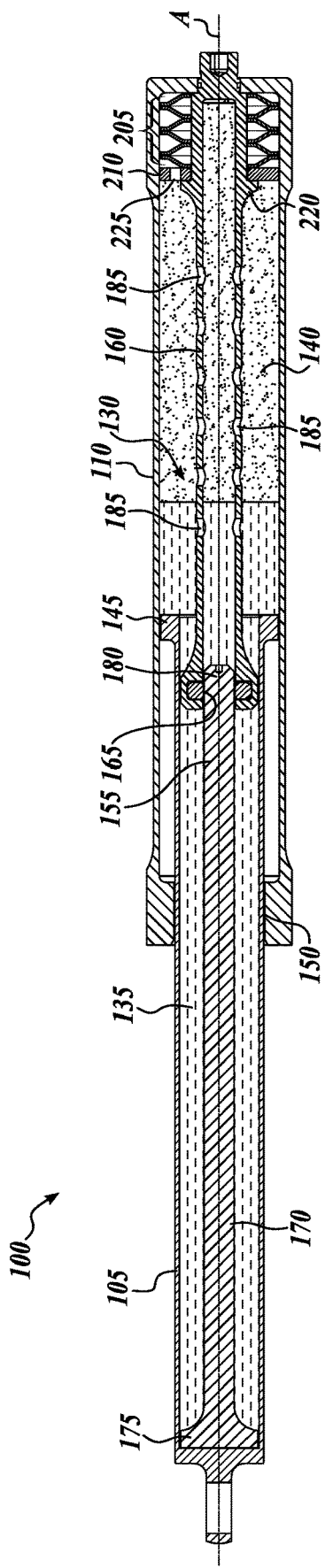
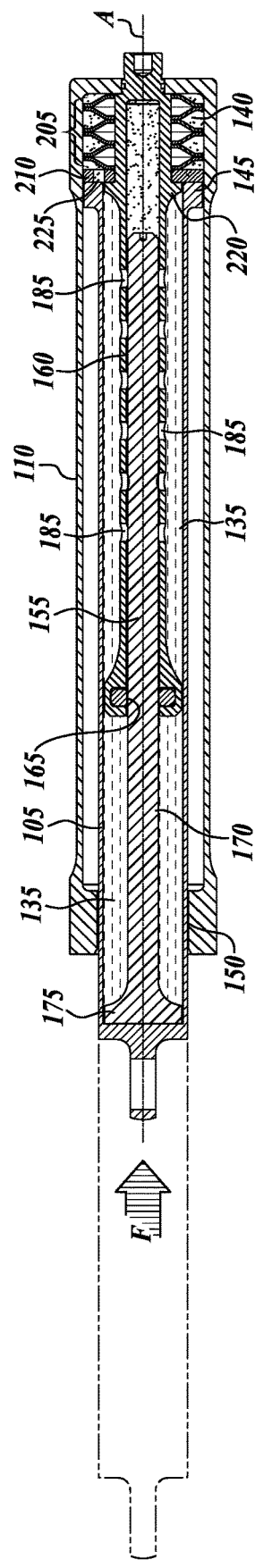
FIG. 4A
FIG. 4B

SHOCK ABSORBING STRUT

BACKGROUND

Most aircraft are equipped with landing gear that enables the aircraft to safely land on the ground. In some types of landing gear, shock-absorbing struts are employed to cushion landing impacts, dampen repeat oscillations, and reduce the tendency for an aircraft to rebound or "bounce."

One type of shock-absorbing strut suitable for use in landing gear that can accomplish these benefits is referred to as an oleo-pneumatic shock absorbing strut ("oleo" strut), which converts kinetic energy into potential energy by the use of a pressurized gas, thereby providing elastic spring characteristics. Damping of this energy conversion and reduction of "bounce" is accomplished via oil or the like, typically being forced through a damping orifice. In some configurations of the shock absorbing strut, in addition to the compression and expansion of the gas, the damping force by the oil passing through the orifice contributes to the reaction force of the oleo strut.

One oleo strut known in the prior art is disclosed in U.S. Pat. No. 9,914,532, and is shown in FIG. 1A. Referring to FIG. 1A, a conventional, single stage, oleo-pneumatic strut is shown generally at 10. The strut 10 comprises an inner housing portion 12 slidably coupled in an outer housing portion 14. The inner and outer housing portions 12, 14 together define an internal cavity 16, which contains a fluid 18 comprised of an oil 20 contained in a lower portion thereof and a gas 22 contained in an upper portion thereof. The strut 10 also includes an orifice support tube 28 that defines a conventional damping orifice 30 at its axial end. An optional metering pin 32 can be provided for interacting with the damping orifice 30 in order to improve the efficiency of the strut 10.

Another oleo strut known in the prior art is shown in FIG. 1B. Referring now to FIG. 1B, a conventional, two-stage, oleo-pneumatic strut is shown generally at 10'. The two-stage strut 10' comprises an inner housing portion 12' slidably coupled in an outer housing portion 14'. A floating piston 40' is slideably disposed within the inner housing portion 12', defining a chamber 42' between the floating piston 40' and the closed, lower end of the inner housing portion 12'. Seals, rings or other suitable sealing devices, generally designated 44', are provided to create a sealed chamber for containment of gas 46' under high pressure. An optional metering pin (similar to FIG. 1A but not shown) can also be provided for interacting with the damping orifice 30' in order to improve the efficiency of the strut 10'.

Opposite the high pressure gas chamber 42' (e.g., above the floating piston), the inner and outer housing portions 12', 14' together define an internal cavity 16', which contains a fluid 18' comprised of an oil 20' contained in a lower portion thereof and a gas 22' at low pressure contained in an upper portion thereof. An orifice support tube 28' is provided in the outer housing portion 14' that defines a conventional damping orifice 30' at its axial end. The two-stage strut 10' also includes an orifice plate 48' fixedly mounted within the lower portion of the inner housing portion 12' and above the floating piston 40'.

In some landing gear, such as a nose landing gear, one type of oleo-pneumatic shock absorbing strut, called a "jump strut", can be employed to provide for an increase in nose rotation during take-off in addition to its impact reduction capabilities. A jump strut typically includes an oleo strut along with a pneumatic system controlled by an electrical control system. The pneumatic system provides high pressure gas to the gas chamber of the oleo strut based on control signals received from the electrical control system. Application of high pressure gas to the upper gas chamber rapidly extends the strut, and the subsequent reaction forces from the ground surface cause the nose of the aircraft to lift.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present disclosure, an energy absorbing apparatus for an aircraft is provided. The apparatus in an embodiment comprises a first load limiter including an oleo-pneumatic strut configured to absorb impact energy and a second load limiter integrally formed within the oleo-pneumatic strut. In an embodiment, the second load limiter includes one or more disc springs.

In an embodiment, the first load limiter is configured to absorb impact energy associated with normal operating conditions and the second load limiter is configured to absorb additional impact energy that exceeds the impact energy associated with normal operating conditions of the aircraft.

In an embodiment, the oleo pneumatic strut comprises an inner cavity that contains a strut fluid composed of gas and hydraulic fluid, and a piston movable a predetermined distance in the inner cavity and capable of compressing the gas. The one or more disc springs are positioned in the inner cavity to absorb impact energy after the piston has moved the predetermined distance.

In an embodiment, the one or more springs includes a first set of disc springs positioned in the inner cavity and a second set of disc springs positioned in the inner cavity a spaced distance from the first set of disc springs.

In an embodiment, the oleo pneumatic strut further comprises a metering pin positioned in the piston, and an orifice support tube arranged to slidably receive the metering pin through a damping orifice.

In an embodiment, the oleo pneumatic strut further comprises a plate positioned on the orifice support tube or the metering pin to retain the one or more disc springs.

In an embodiment, the piston strikes the plate when the piston is moved a predetermined distance or the orifice support tube strikes the plate when the piston is moved a predetermined distance.

In an embodiment, the oleo-pneumatic strut comprises an inner housing portion slidably coupled within an outer housing portion, an inner cavity formed by the inner housing portion and the outer housing portion, a first chamber disposed in the interior cavity and containing a pressurized gas, a floating piston positioned in the inner cavity to define a sealed, second chamber on a first side of the floating piston, and hydraulic fluid disposed in the inner cavity between the first chamber and the floating piston. In an embodiment, the one or more disc springs of the second load limiter are positioned in the second chamber.

In accordance with another aspect of the present disclosure, a retractable landing gear comprises any of the embodiments of the apparatus set forth above.

In accordance with still another aspect of the present disclosure, a shock absorbing strut for a vehicle is provided. In an embodiment, the strut comprises an inner housing portion slidably coupled within an outer housing portion, an inner cavity formed by the inner housing portion and the outer housing portion; the inner cavity defining a sealed fluid volume for containing strut fluid including hydraulic fluid and gas, a piston movable within the inner cavity a predetermined distance to compress the gas and absorb energy acting upon the strut, a damping orifice in fluid communication with the hydraulic fluid, and one or more disc springs positioned in the strut to absorb additional energy acting upon the strut after the piston is moved the predetermined distance.

In an embodiment, the piston is integrally formed with the inner housing portion. In an embodiment, the one or more disc springs are positioned at an end of the outer housing portion and the piston acts upon the one or more disc springs when the piston is moved the predetermined distance.

In an embodiment, the strut further comprises an orifice support tube positioned in the outer housing section and defining the damping orifice. In an embodiment, the one or more disc springs are positioned around the orifice support tube.

In an embodiment, the strut further comprises an orifice support tube positioned in the outer housing section, and a metering pin positioned in the piston. In an embodiment, the orifice support tube is arranged to slidably receive the metering pin through the damping orifice. In another embodiment, the piston is integrally formed with the inner housing portion.

In an embodiment, the strut further comprises an orifice support tube positioned in the outer housing section and defining the damping orifice. The one or more disc springs in an embodiment are positioned at an end of the inner housing portion and the orifice support tube acts upon the one or more disc springs when the piston is moved the predetermined distance.

In an embodiment, the one or more disc springs comprise a first set of disc springs positioned in the inner cavity a spaced distance from a second set of disc springs. In another embodiment, the first or second set of disc springs includes a plurality of disc springs arranged in parallel, in series, or a combination thereof.

In an embodiment, the strut further comprises a source of pressurized gas selectively connected in fluid communication with the inner cavity.

In an embodiment, the strut further comprises a control valve in fluid communication with the source of pressurized gas, wherein control of the control valve selectively supplies pressurized gas from the source of pressurized gas to the inner cavity to rapidly extend the strut.

In accordance with yet another aspect of the present disclosure, a retractable landing gear comprises any of the embodiments of the strut set forth above.

In accordance with still yet another aspect of the present disclosure, a two-stage aircraft shock absorbing strut is provided. The two-stage strut comprises an inner housing portion slidably coupled within an outer housing portion, an inner cavity formed by the inner housing portion and the outer housing portion, a first chamber disposed in the interior cavity and containing a pressurized gas, a floating piston positioned in the inner cavity to define a sealed, second chamber on a first side of the floating piston, hydraulic fluid disposed in the inner cavity between the first chamber containing pressurized gas and the floating piston, a damping orifice in fluid communication with the hydraulic fluid, and one or more disc springs positioned in the second chamber to absorb energy acting upon the strut after the floating piston is moved a predetermined distance.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIGS. 4A-4B are cross sectional views of the shock absorbing strut taken along line 4-4 in FIG. 2;

DETAILED DESCRIPTION

Figure 1A:
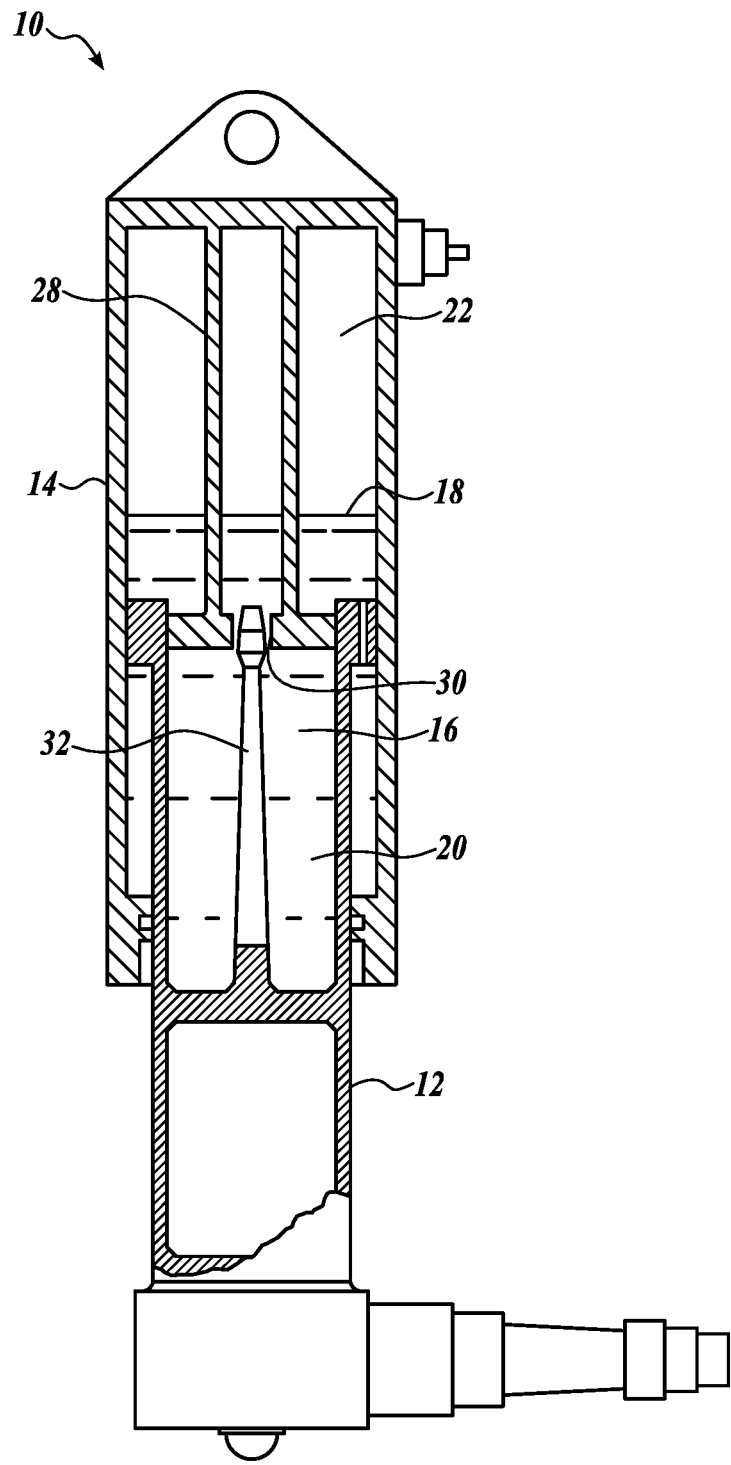
FIG. 1A is a cross-sectional view of a conventional oleo-pneumatic strut.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following description provides several examples of techniques and methodologies for storing or absorbing energy in a vehicle, such as an aircraft (e.g., airplane, helicopter, etc.). Some of the techniques and methodologies also provide energy/vibration damping to the vehicle. As will be described in more detail below, examples of one or both of these techniques and methodologies can be implemented in a shock absorber, a strut, a load limiter or other shock/force absorbing device.

Several examples of these shock/force absorbing devices are particularly suited for use in a landing gear of either a fixed wing aircraft or a rotary wing aircraft, and can be referred to generally as a shock strut. In some embodiments, the shock strut can be used as the main strut of the landing gear. In certain embodiments, the shock strut can be incorporated with a landing gear of the retractable type.

Generally described, a shock strut supports the aircraft body during taxiing and take-off, and absorbs impact energy and/or dampens shocks when the aircraft touches down after flight. In some embodiments, the shock strut may be specific to the operating needs of a particular aircraft. For example, a commercial passenger airplane has a heavier body and payload which requires specific energy absorption and/or damping needs when performing a conventional, trajectory landing. A military plane performing vertical take-off and landing has a different set of landing requirements, and carrier or other vessel-based takeoff/landing requirements (e.g., vertical, catapult, arrested, etc.) can be different from land-based requirements. For instance, a carrier-based aircraft employing landing gear with a jump strut may have a different set of operational (e.g., take-off or landing) requirements. And a helicopter performing an urgent, quick landing has a different set of energy absorption and/or shock absorbing requirements. As will be described in more detail below, embodiments of the shock strut disclosed herein can be scaled to various design parameters either by changing the size, quantity, or materials of the strut themselves or the strut components.

In use, the shock strut absorbs and/or dampens the landing impact energy and aims to prevent any "excessive" force from the landing from being transferred to the body of the aircraft. In that regard, some embodiments of the shock struts disclosed herein comprise a first energy absorption stage or load limiter and a second energy absorption stage or load limiter to provide, for example, design flexibility for accommodating a range of descent velocities, aircraft weights, etc. In some of these embodiments, the first and second stages can be either employed serially or in parallel during take-off and/or landing. In some embodiments, the second stage is capable of providing, for example, a variable spring rate to the strut. The strut, and the second stage in some embodiments, can be additionally or alternatively configured to achieve various design/performance requirements (e.g., extreme temperatures, aircraft sill heights, flexibility of breakout loads at a specific stroke, etc.).

In examples of the struts disclosed herein, the first and second load limiters can be used together during normal operating conditions of the aircraft. In some instances, however, a landing generates abnormal or excessive forces upon the aircraft and conventional struts may be insufficient or ineffective when a landing force exceeds a preselected landing threshold. To address these operational challenges, the first stage or load limiter in some embodiments can be configured to absorb all of the normal impact forces that occur during normal landing conditions without aid of the second stage or load limiter. However, during abnormal landing conditions, where the landing force exceeds normal operational perimeters, both the first stage or load limiter and the second stage or load limiter work together to absorb the abnormally high impact forces. In some of these embodiments, energy dissipation or damping can be additionally or alternatively carried out in the first stage, the second stage, or both.

Figure 1B:
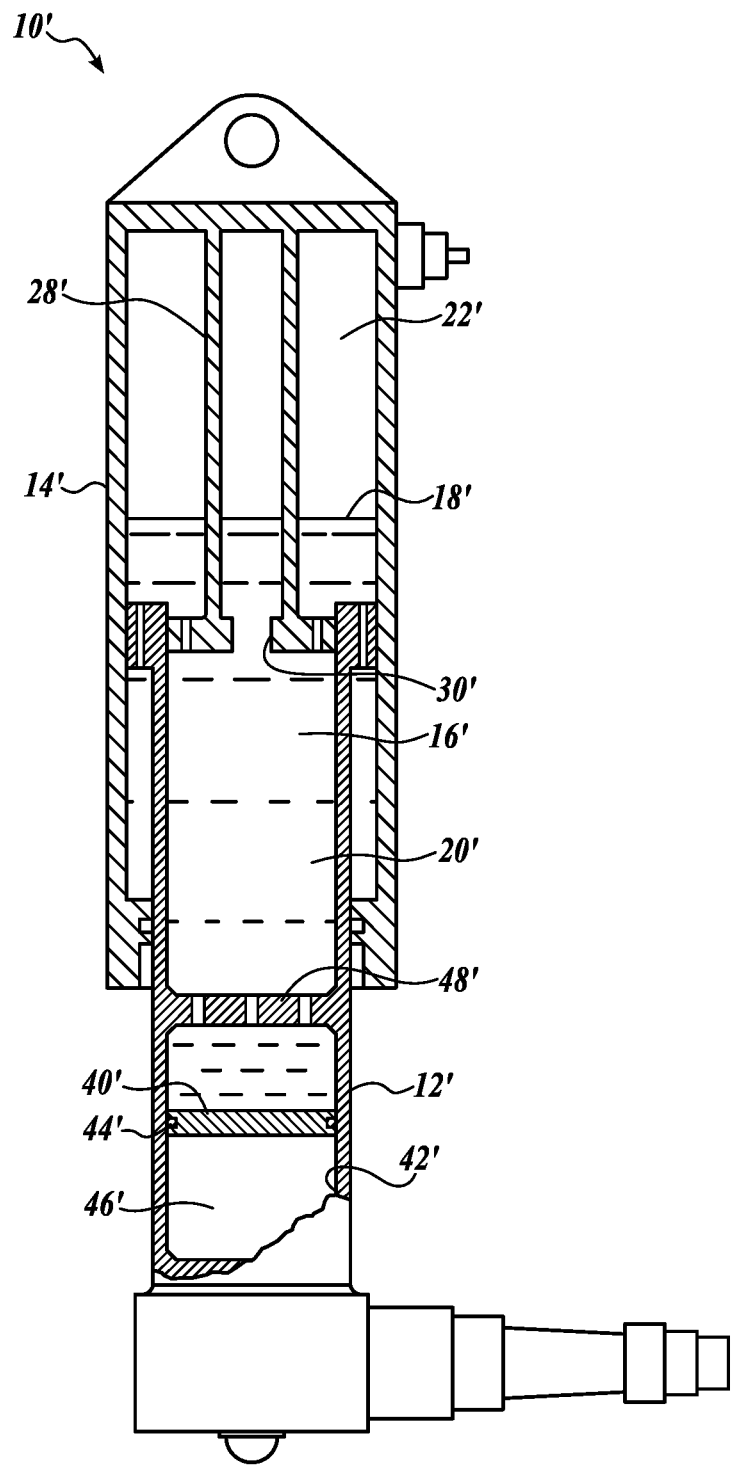
FIG. 1B is a cross-sectional view of a conventional, two-stage oleo-pneumatic strut.

In some embodiments, the first stage or load limiter is in the form of an oleo-pneumatic strut and the second stage or load limiter is in the form of one or more springs integral with the oleo-pneumatic strut. In other embodiments, the first stage or load limiter is the first stage of a 2-stage oleo strut, such as the strut briefly described in FIG. 1B. In these embodiments, the second stage or load limiter is in the form of one or more springs, which can be employed in lieu of the high pressure gas chamber of the 2-stage oleo strut. As will be described in more detail below, the one or more springs in some of these embodiments are disc springs, the benefits of which allow for a compact shock strut to be employed, for example, in retractable landing gear.

Although some embodiments of the present disclosure will be described with reference to an aircraft, one skilled in the relevant art will appreciate that the disclosed embodiments are illustrative in nature, and therefore, should not be construed as limited to applications with an aircraft. It should therefore be apparent that the techniques and methodologies set forth by one or more representative embodiments of the present disclosure have wide application, and may be used in any situation where absorption and/or damping of energy is desirable.

Figure 2:
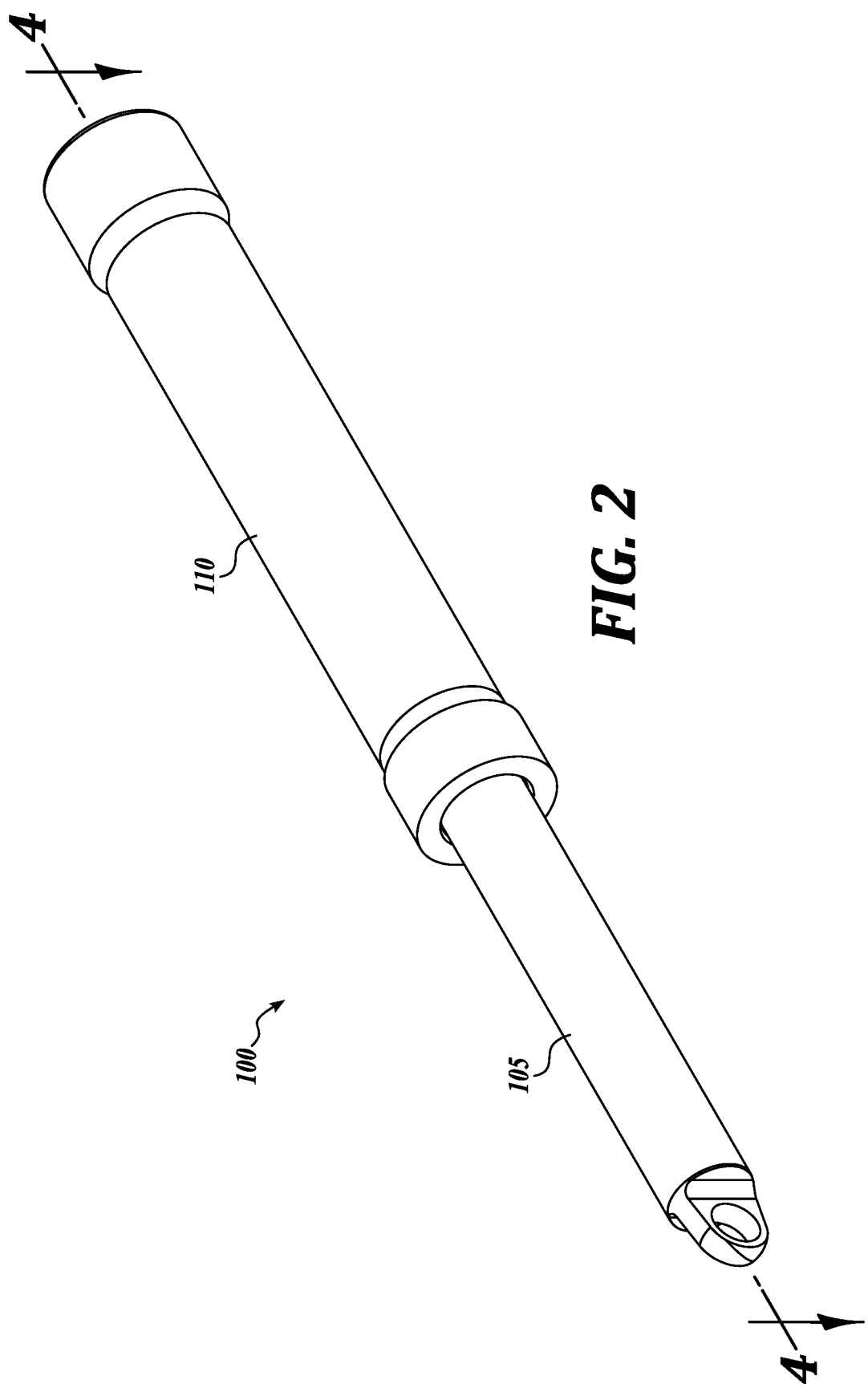
FIG. 2 is a perspective view of a representative embodiment of a shock absorbing strut in accordance with the present disclosure.

Turning now to FIG. 2, a representative embodiment of a shock absorbing strut or shock strut, generally designated 100, is shown. As shown in FIG. 2, the shock strut 100 includes an inner housing section 105 that telescopically engages with an outer housing section 110. Both the inner housing section 105 and the outer housing section 110 may be a tubular-shaped body. As will be described in more detail below, the shock strut 100 can be configured as an "oleo" type strut. In that regard, the shock strut is configured to absorb and dissipate impact energy (e.g., during landings) by compressing a gas (e.g., nitrogen or dry air) contained in the shock strut 100 and dissipating a portion of the compression energy by use of an incompressible fluid (e.g., hydraulic fluid) and a damping orifice contained in the shock strut 100.

Figure 3:
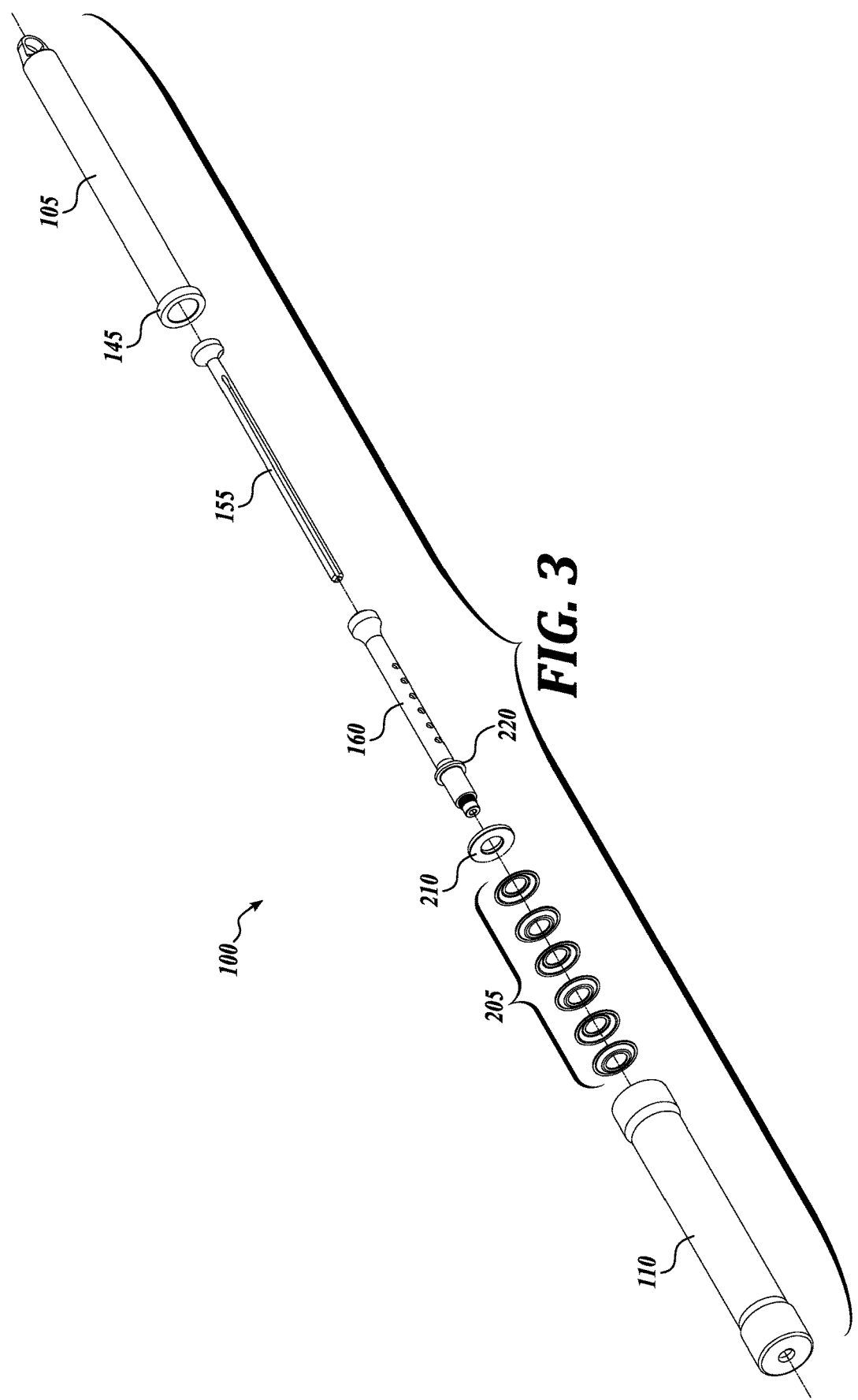
FIG. 3 is an exploded view of the shock absorbing strut shown in FIG. 2.

Referring now to FIGS. 3 and 4A-4B, each component of the shock strut 100 shown in FIG. 2 will be described in more detail. FIG. 3 is an exploded view of the strut 100 shown in FIG. 2. FIGS. 4A and 4B are longitudinal cross-sectional views of the strut 100 taken along lines 4-4 in FIG. 2. The shock strut 100 has a number of static conditions or states, one being shown in FIG. 4A, and a number of compressed condition or states, one being shown in FIG. 4B. In that regard, the overall length of the strut 100 is able to change when the inner housing section 105 translates with respect to the outer housing section 110. For example, when an external force F is applied to the first end of inner housing section 105, the overall length of the strut 100 as defined along a longitudinal axis A may shorten as the inner housing section 105 translates with respect to the outer housing section 110 from an uncompressed state (not shown) to one of the static states (e.g., FIG. 4A) or from one of the static states (e.g., FIG. 4A) to one of the compressed states (e.g., FIG. 4B).

It will be appreciated that the static state of the strut 100 is determined by, for example, the sprung mass (e.g., weight of the aircraft body) and the design of strut. In some embodiments, the static length of the strut 100 is within 5-10% (or less) of the static length of a conventional oleo strut that is employed in a retractable landing gear.

As shown in FIG. 4A, the inner housing section 105 is formed as a piston ("piston 105"), which is slidably coupled in a telescoping manner to the outer housing section 110, referred to hereinafter as the outer cylinder 110. The piston 105 and the outer cylinder 110 together define an internal cavity 130, which contains a strut fluid. The internal cavity 130 contains hydraulic fluid 135 in the piston 105 and gas 140 in an outer cylinder 110. The hydraulic fluid 135 and the gas 140 together make up the shock strut fluid. In some embodiments, the hydraulic fluid 135 includes, for example, oil, water, water-oil emulsions, salt solutions, etc., or combinations thereof, and the gas 140 includes air, nitrogen, etc. or combinations thereof. Between the piston 105 and the cylinder 110 are located bearings, such as piston end flange 145 and lower bearing or gland 150, and seals (not shown), which enable the piston 105 to slide within the outer cylinder 110 without leakage of the strut fluid from the internal cavity 130. Thus, the internal cavity 130 defines a chamber with a sealed fluid volume for containing the strut fluid. In some embodiments, both the gas and the liquid may be compressible.

When a load, such as force F shown in FIG. 4B, is applied to the strut 100, the piston 105 slides into the outer cylinder 110, thereby transitioning the strut 100 to one of a number of compressed states. This causes a compression of the gas 140 inside the internal cavity 130, thereby absorbing energy. When the load, such as force F, is removed from the strut 100, the internal pressure of the strut fluid causes the piston 105 to slide out of the outer cylinder 110 so that the strut 100 expands, thereby expending energy.

In some embodiments, the strut 100 is configured to dampen the motion of the piston with respect to the outer cylinder, thereby dissipating at least some of the energy being stored or expended by strut 100, and to limit the recoil of the strut 100 in order to decrease the chance of "bounce" on landing. In this regard, a damper, a damping arrangement or other means for damping is provided.

In the embodiment shown, the damping arrangement includes, for example, an optional metering pin 155 and an orifice support tube 160. In some embodiments, the orifice support tube 160 is positioned in the outer cylinder 110 and defines a damping orifice 165 at its axial end for receiving the metering pin 155. In some embodiments, the metering pin 155 may be positioned within the piston 105. The metering pin 155 may have an elongated body 170 which may transition to a base flange 175 at the attachment or lower end of the piston 105. In some embodiments, the metering pin 155 may be arranged so as to be entirely contained within the piston 105. In this or other embodiments, the metering pin 155 slidably engages the orifice support tube 160 through damping orifice 165 as the piston 105 translates with respect to the outer cylinder 110.

In operation, as the piston 105 translates with respect to the outer cylinder 110, the orifice support tube 160 is received by the piston 105. As such, the cooperation between the metering pin 155 and the damping orifice 165 determines, at least in part, the damping characteristics of the strut 100. In some embodiments, damping by the hydraulic fluid 135 passing through the damping orifice 165 contributes to the reaction force of the strut 100. Accordingly, this absorption and/or damping of the impact kinetic energy by the strut 100 is carried out by the first impact reduction stage or load limiter.

It will be appreciated that the configuration of the metering pin 155 can be changed in different embodiments in order to vary the performance characteristics (e.g., spring rate, damping, etc.,) of the strut 100. In some embodiments, the elongated body 170 may be tapered or fluted (see FIG. 3) in order to tune the performance characteristics of the strut 100. For example, a cross-section area of the elongated body 170 may gradually decrease from the base flange 175 towards a tip 180 of the metering pin 155 or in sections thereof. Other shapes can also be employed in embodiments of the present disclosure. Of course, the metering pin 155 is optional, and can be omitted in some embodiments. In embodiments where the metering pin 155 is omitted, the damping orifice 165 provides damping for the strut 100.

In some embodiments, the orifice support tube 160 may further comprise multiple orifices 185 in the wall of the orifice support tube 160 to provide additional damping or snubbing. Of course, the size, number and location of the orifices 185 can also be altered to affect the performance characteristics (e.g., spring rate, damping, etc.) of the strut 100.

The strut 100 further includes a second impact reduction stage or load limiter integrally formed within the strut 100. FIGS. 3 and 4A-4B illustrate one example of the second impact reduction stage or load limiter that can be practiced with embodiments of the present disclosure. As shown in FIGS. 3 and 4A-4B, the second stage includes one or more springs 205 (shown as three pairs of springs arranged in series) disposed in the attachment or upper end of the outer cylinder 110, and a slideable plate 210 exposed to gas 140 and disposed adjacent the one or more springs 205.

In the embodiment shown, each spring 205 of the one or more springs 205 is a disc spring or cone washer, which is sometimes referred to as a Belleville washer. In some embodiments, the one or more springs 205 are stacked around and supported by the base of the orifice support tube 160, and retained in place by the plate 210. In this regard, the translational movement of the plate 210 in the direction opposite the one or more springs may be limited by shoulder 220 of the orifice support tube 215. In some embodiments, the plate 210 may provide a substantially planar surface for contact with the piston 105 and distribute the force F evenly around a perimeter of the one or more springs 205. The even distribution of the force F may provide a steady and predictable spring constant.

Optionally, the plate 210 may include a relief orifice 225 through one side thereof to regulate the gas pressure on both sides of the plate 210. Other configurations are possible to allow gas communication between the spaces formed on either side of the plate 210. In these embodiments, the space that contains the one or more springs is part of the internal cavity 130. In other embodiments, the relief orifice 225 is omitted and seals, rings or other sealing devices are used at the interfaces between the plate 210 and the outer cylinder 110 and the orifice support tube 160 to create a sealed chamber for housing the one or more springs 205.

Figure 10A:
FIGS. 10A-10E depict a number of representative arrangements of the one or more springs.
Figure 10B:
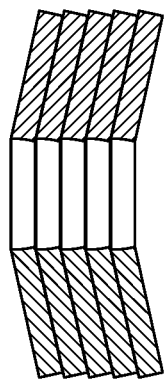
Figure 10C:
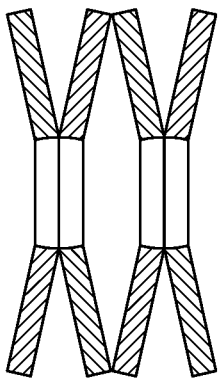
Figure 10D:
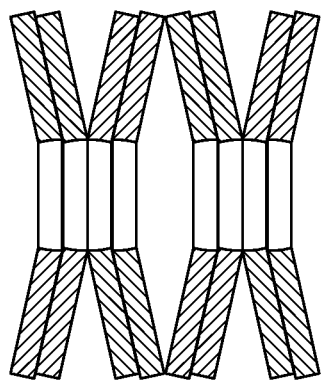
Figure 10E:
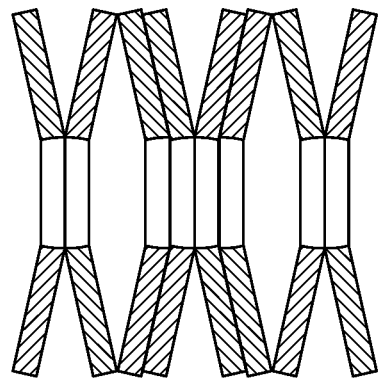

The one or more springs 205 may include a plurality of springs 205 arranged in series, as shown in both FIGS. 4A and 10C, or in parallel (see FIG. 10B), or in some series/parallel combination thereof (see FIGS. 10D and 10E). Of course, a single spring 205 (see FIG. 10A) may be also used. It will be appreciated that the quantity and arrangement of the one or more springs 205 will determine the spring constant and deflection capacity for the one or more springs 205. For example, stacking the springs in the same direction (e.g., in parallel, see FIG. 10B) will result in a larger spring constant but a lower amount of deflection. Stacking in an alternating direction (e.g., in series), such as is shown in FIGS. 4A and 10C, will result in a larger amount of spring deflection but a lower spring constant. In some embodiments, one or more of the springs 205 may be preloaded. Varying the quantity and/or arrangement of the springs 205, of which several examples are shown in FIG. 10A-10E, can tailor the energy absorbing ability of the second impact reduction stage to its intended application. Accordingly, the strut 100 can be designed for a range of descent or impact velocities and aircraft weights.

Additional or alternatively, other design parameters of the one or more springs can be manipulated to tailor the energy absorbing ability of the second impact reduction stage to its intended application. For example, the thickness of the one or more springs, the material of the one or more springs, the profile (e.g., height, outer diameter, inner diameter, etc.) of the spring, etc., also contribute to the spring constant and deflection capacity. In some embodiments, the one or more springs are made of metal. In other embodiments, the one or more springs are made of or include a composite material (e.g., carbon fiber, carbon fiber reinforced polymer) that is lighter than metal.

In embodiments of the present disclosure, each of the parameters set forth above and/or others can be manipulated singularly or in any combination to achieve the desired load deflection curve to accommodate a range of descent velocities and aircraft weights. Thus, in some embodiments, each of the one or more springs 205 is identical, and in other embodiments, one or more of the springs is different by at least one parameter. In some embodiments that include a group of springs, one or more of the springs, or subgroups of the springs, can be different by two or more parameters, by three or more parameters, by four or more parameters, etc. In some embodiments that include a plurality of springs, the parameters of each spring can be chosen such that one or more of the springs fail, thus releasing the stored energy therein. Additionally or alternatively, other energy storage release devices may be practiced with embodiments of the present disclosure, including, for example, a fuse pin arrangement, friction increasing techniques, one or more relief valves, etc.

In some embodiments, a cap (not shown) proximate the upper end of the outer cylinder 110 may be provided to allow for serviceability of the one or more disc springs 205. For example, the cap may screw into or otherwise be removably affixed to the upper end of the outer cylinder 110. This may allow the one or more disc springs 205 to be inspected and, if required, replaced, upon a forceful landing.

The foregoing embodiments have been described in which both the first and second load limiters work together to absorb and/or dampen the impact energy during, for example, normal aircraft operating conditions. Normal aircraft operating conditions can include, for example, descent velocities up to 10 feet/second (3.408 meters/second) in some applications, up to 15 feet/second (4.572 meters/second) in other applications, up to 20 feet/second (6.096 meters/second) in some other applications, and between 24-28 feet/second (7.315-8.534 meters/second) in yet other applications, or higher. Of course, other descent velocities may be considered "normal" as intended applications and landing requirements for landing gear vary greatly.

However, in some instances, the force F on the strut 100 may require further absorption and/or damping to prevent damage due to impact of the airframe. For example, in some instances, the aircraft may experience emergency landings, quick landings, weather related conditions, or the like that may cause the aircraft to strike or impact the ground with a force greater than would occur during normal operating conditions. As such, the strut 100 in some embodiments may be configured to provide additional impact kinetic energy absorption and/or damping during these abnormal conditions. In some embodiments, this absorption and/or damping of additional impact kinetic energy can be carried out by the second impact reduction stage or load limiter.

Referring now to FIGS. 4A-4B, one method of using the strut 100 according to an embodiment of the present disclosure will now be described in some detail. When an impact force is applied to piston 105 during, for example, normal operating conditions, the first impact reduction stage or load limiter is arranged in one embodiment to absorb all of the impact forces without aid of the second impact reduction stage. However, when an abnormal impact force (e.g., a force that exceeds a maximum impact force during normal operating conditions) is applied to piston 105, the first impact reduction stage may not be able to absorb all of the energy generated by abnormal impact force.

As a result, the first impact reduction stage absorbs and dampens as much impact energy as possible according to its design, and any additional impact energy is then absorbed by the second impact reduction stage or load limiter. In one example, after the first impact reduction stage absorbs enough impact energy to cause the piston 105 to "bottom" or strike the plate 210 (see FIG. 4B), the piston 105 may continue to press on the plate 210 due to the magnitude of the force F and compress one or more of the springs 205 to absorb and/or dampen the additional impact energy. In another example, when sufficient pressure (e.g., equilibrium pressure) is generated by translation of the piston 105 and compression of the gas 140, any additional translation of piston 105 due to the magnitude of the force F compresses one or more of the springs 205 to absorb and/or dampen the additional impact energy. In some embodiments, the magnitude of the force can trigger one or more of the energy storage release devices briefly described above.

Thus, when subjected to an abnormal impact force, both the first and second impact reduction stages operate to reduce the chances of aircraft damage. In some embodiments, the strut 100 is designed such that the full energy and/damping capabilities of the first impact reduction stage are exhausted before engagement with the second impact reduction stage. In some embodiments, this can occur when the piston is in the position shown in FIG. 4B briefly described above. In other embodiments, the second impact reduction stage is engaged prior to piston contact with the plate 210.

Figure 5:
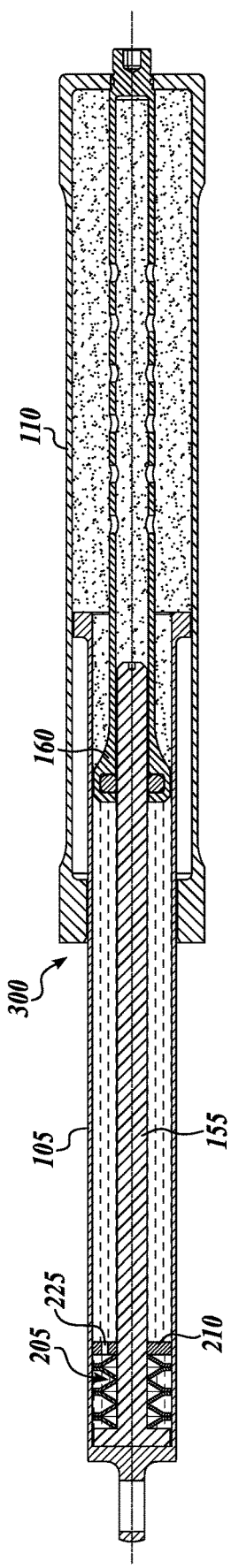
FIG. 5 is a cross sectional view of another embodiment of a shock absorbing strut in accordance with the present disclosure.

In some embodiments, the one or more springs 205 and plate 210 may be arranged in a different location within the shock strut. For example, the one or more springs 205 may be positioned toward the attachment or lower end of the piston 105, as shown in the embodiment of FIG. 5. In this embodiment, engagement of the second impact reduction stage for providing additional energy absorption and/or damping to the strut 300 can occur, for example, when the orifice support tube 160 contacts the plate 210. In this embodiment, the plate includes one or more relief orifices 225 that act as damping orifices to allow plate 210 to translate against and compress the one or more springs 205. In other embodiments, the relief orifice 225 is omitted and seals, rings or other sealing devices are used to create a sealed, gas chamber (e.g., under low pressure, at atmospheric pressure, under vacuum, etc.) for housing the one or more springs 205.

Figure 6:
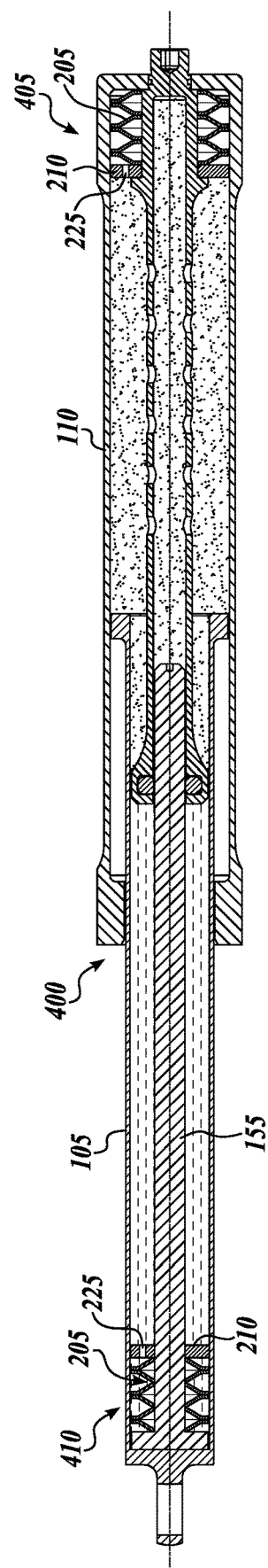
FIG. 6 is a cross sectional view of still another embodiment of a shock absorbing strut in accordance with the present disclosure.

In other embodiments, one being shown in FIG. 6, the strut 400 may incorporate multiple sets of springs at different positions along the strut for providing additional or second stage energy absorption and/or damping. For example, as shown in FIG. 6, the strut 400 may incorporate a first set 405 of springs 205 in the top end of the cylinder 110, substantially similar to the strut 100, and a second set 410 of springs 205 in the bottom end of the piston 105, substantially similar to the strut 300. Together, the first set 405 of springs 205 and the second set 410 of springs 205 form the second impact reduction stage. In some embodiments, the relief orifices 225 are omitted and seals, rings or other sealing devices are used to create sealed, gas chambers (e.g., under low pressure, at atmospheric pressure, under vacuum, etc.) for housing the first set 405 and the second set 410 of springs 205.

Figure 7:
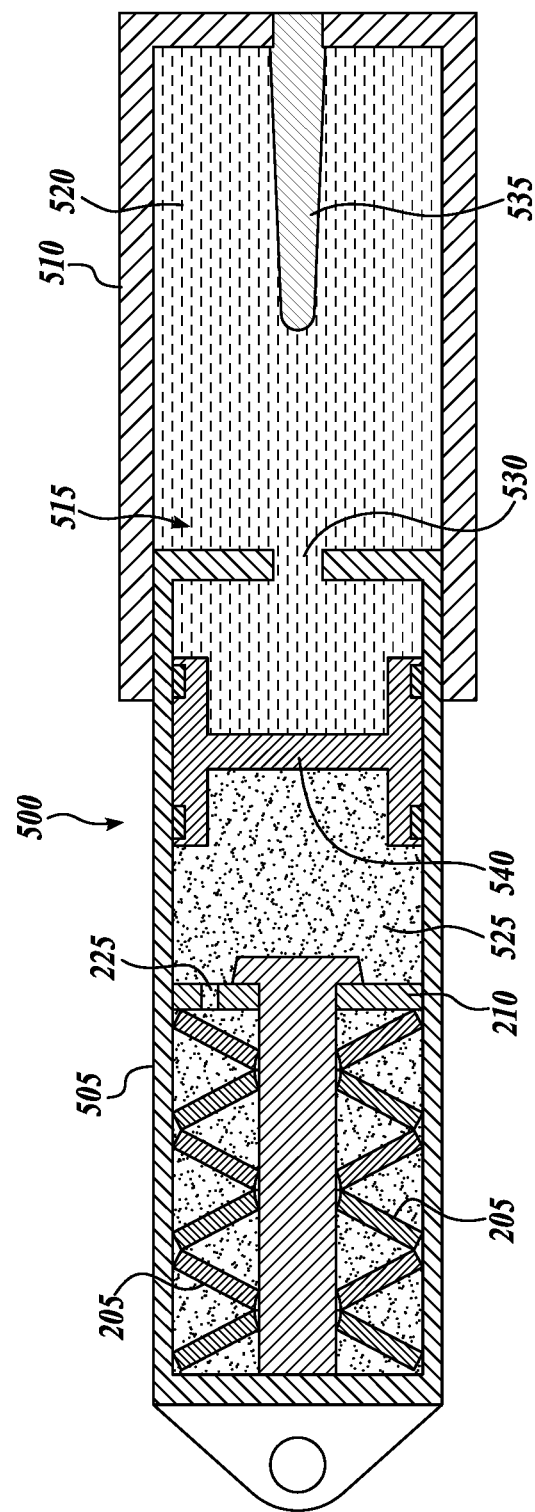
FIG. 7 is a cross sectional view of yet another embodiment of a shock absorbing strut in accordance with the present disclosure.

FIG. 7 is a cross-sectional view of another embodiment of a strut, generally designated 500, formed in accordance with the present disclosure. As shown in FIG. 7, the strut 500 comprises an inner housing portion 505 slidably coupled in an outer housing portion 510. The inner and outer housing portions 505, 510 together define an internal cavity 515, which contains a fluid comprised of a hydraulic fluid 520 contained in an upper portion thereof and gas 525 contained in a lower portion thereof. The inner housing portion 505 includes a through bore 530 that defines a damping orifice. An optional metering pin 535 may be provided.

In the embodiment of FIG. 7, a floating piston 540 is disposed in the inner housing portion 505 and separates the hydraulic fluid 520 from the gas 525. Together, these components form an embodiment of the first impact reducing stage or load limiter. As shown in FIG. 7, the strut 500 also includes the second impact reducing stage or load limiter integrally formed therewith. The second stage or load limiter in this embodiment includes the one or more springs 205 and the plate 210 disposed at the attachment end of the inner housing portion 505. In some embodiments, the relief orifice 225 is omitted and seals, rings or other sealing devices are used to create a sealed, gas chamber (e.g., under low pressure, at atmospheric pressure, under vacuum, etc.) for housing the one or more springs 205.

Figure 8:
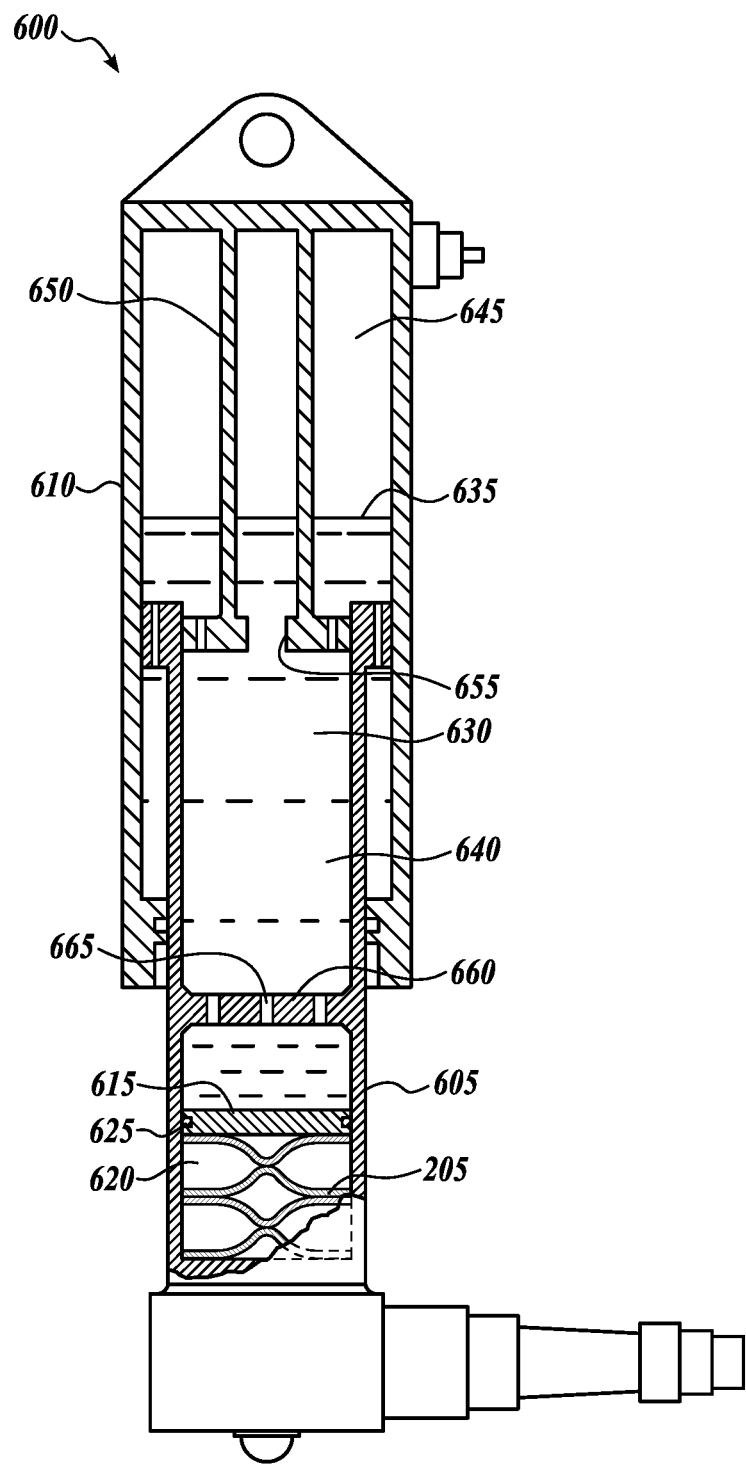
FIG. 8 is a cross sectional view of an embodiment of a two-stage shock absorbing strut in accordance with the present disclosure.

FIG. 8 is a cross-sectional view of an embodiment of a two-stage strut, generally designated 600, employing a number of springs 205 as the second stage or load limiter. As shown in FIG. 8, the two-stage strut 600 comprises an inner housing portion 605 slidably coupled in an outer housing portion 610. A floating piston 615 is slideably disposed within the inner housing portion 605, defining a chamber 620 between the floating piston 615 and the closed, lower end of the inner housing portion 605. Seals, rings or other suitable sealing devices, generally designated 625, are provided to create a sealed chamber below the floating piston 615. A number of springs 205 are disposed within the sealed chamber and arranged to act against the floating piston 615 and the end of inner housing portion 605, thereby forming an embodiment of the second stage or load limiter. The sealed chamber can be filled with gas under low pressure, at atmospheric pressure, or under vacuum pressure, depending on the intended application of the strut.

Opposite the sealed chamber 620 (e.g., above the floating piston), the inner and outer housing portions 605 and 610 together define an internal cavity 630, which contains a fluid 635 comprised of a hydraulic fluid 640 contained in a lower portion thereof and a gas 645 at low pressure contained in an upper portion thereof. An orifice support tube 650 is provided in the outer housing portion 610 that defines one or more damping orifices 655 at its axial end. The two-stage strut 600 also includes an orifice plate 660 fixedly mounted within the lower portion of the inner housing portion 605 and spaced above the floating piston 615. The orifice plate 660 includes one or more orifices 665.

Upon landing, or other loading in non-aviation uses, the shock strut 600 is compressed from a fully extended position, shown in FIG. 8, through a first stage of compression (not shown), and to a second stage of compression (not shown). As the initial load is applied in the first stage, hydraulic fluid is urged by the piston surfaces of the inner housing portion 605 through the orifice(s) 655 and compresses the gas 645. Once equilibrium is reached between compressed gas 645 and the spring force generated by the one or more springs 205 against the floating piston 615, further translation of the inner housing portion 605 due to external loads causes the floating piston 615 to push against and compress the one or more springs 205 during the second stage, thereby absorbing additional energy (e.g., impact energy, bumps during taxiing, etc.).

Figure 9:
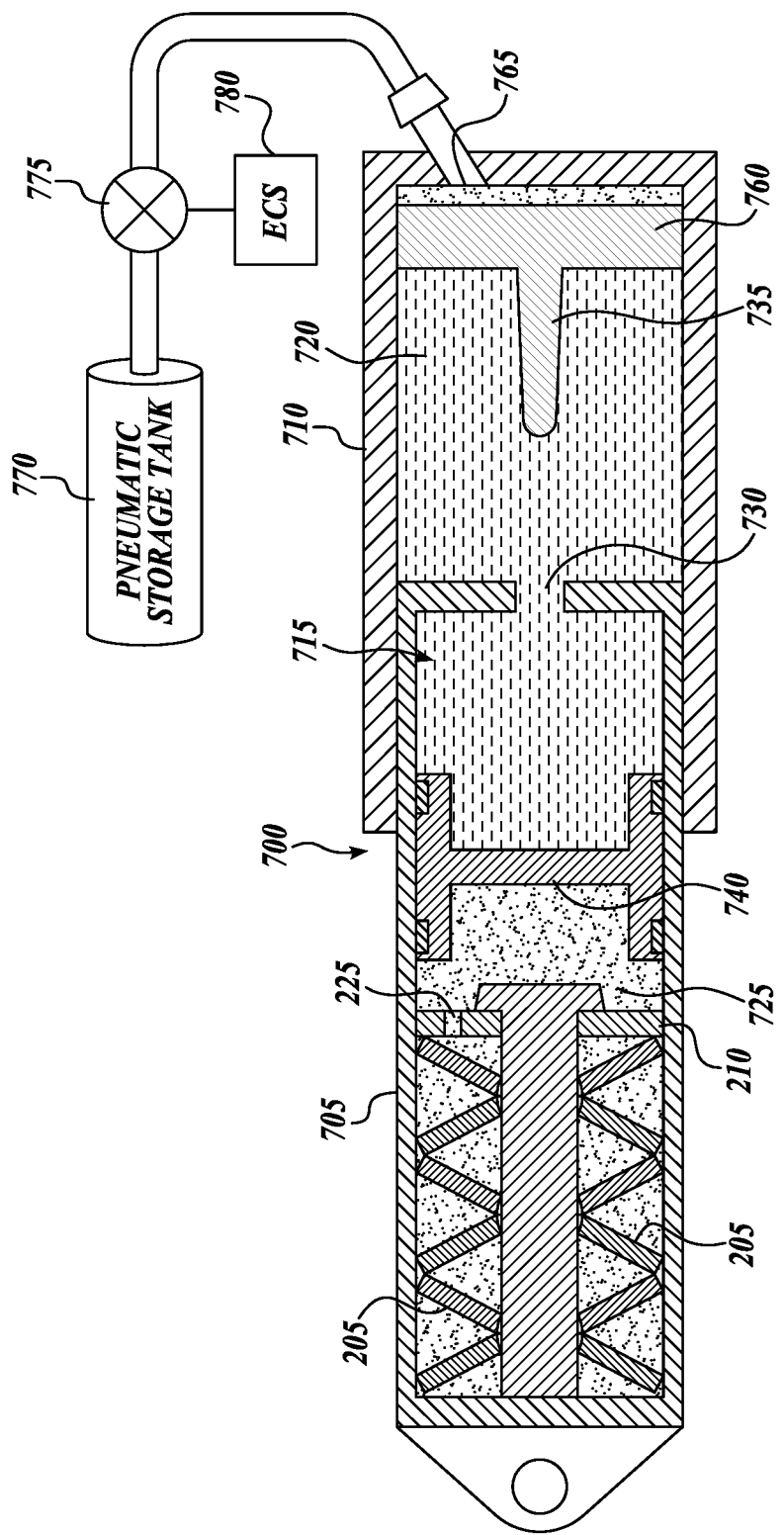
FIG. 9 is a cross sectional view of an embodiment of a jump strut in accordance with the present disclosure.

FIG. 9 is a cross-sectional view of another embodiment of a strut, sometimes referred to as a jump strut, generally designated 700, and suitable for use in a nose landing gear. As shown in FIG. 9, the strut 700 comprises an inner housing portion 705 slidably coupled in an outer housing portion 710. The inner and outer housing portions 705, 710 together define an internal cavity 715, which contains a fluid comprised of a hydraulic fluid 720 contained in an upper portion thereof and gas 725 contained in a lower portion thereof. The inner housing portion 705 includes a through bore 730 that defines a damping orifice. An optional metering pin 735 may be provided.

In the embodiment of FIG. 9, a floating piston 740 is disposed in the inner housing portion 705 and separates the hydraulic fluid 720 from the gas 725. Together, these components form an embodiment of the first impact reducing stage or load limiter. As shown in FIG. 9, the strut 700 also includes the second impact reducing stage or load limiter integrally formed therewith. The second stage or load limiter in this embodiment includes the one or more springs 205 separated by the gas 725 via a plate 210 disposed at the attachment end of the inner housing portion 705. In some embodiments, the relief orifice 225 is omitted and seals, rings or other sealing devices are used to create a sealed, gas chamber (e.g., under low pressure, at atmospheric pressure, under vacuum, etc.) for housing the one or more springs 205.

The strut 700 further includes a movable jump piston 760 disposed in the upper portion of inner cavity 715. In the embodiment shown, the metering pin 735 is mounted to the jump piston 760. A passage 765 is formed in the wall of the upper housing portion 710 above the jump piston 760. Connected to the inner cavity via the passage 765 is a source of pressurized gas, such as a pneumatic storage tank 770. Pressurized gas stored in the pneumatic storage tank 770 is selectively supplied to the passage 765 via control of one or more control valves 775. Control of the one or more control valves 775 is carried out by one or more circuits of an electrical control system (ECS) 780.

The strut 700 is shown in FIG. 9 in a static position prior to take-off. In its static position, equilibrium has been reached between the compressed gas 725 and the spring force generated by the one or more springs 205 against the plate 750. Control signals from the electrical control system 780 to the control valve 775 rapidly supplies high pressure gas to the interior cavity via the passage 765. Supply of high pressure gas to the interior cavity above the jump piston 760 as well as the engagement of the one or more springs 205 rapidly extends the strut, and the subsequent reaction forces from the ground surface cause the nose of the aircraft to lift. A bleed valve or the like can be included to return the jump strut to its pre-extended state.

It will be appreciated that struts 100, 300, 400, 500, 600 and/or 700 can be configured such that the first and second load limiters cooperatingly absorb and/or dampen impact energy under normal operating loads. It will be also appreciated that struts 100, 300, 400, 500, 600 and/or 700 can be configured such that the first and second load limiters cooperatingly absorb and/or dampen impact energy under abnormal operating loads. In some embodiments of the struts 100, 300, 400, 500, 600 and/or 700, the second load limiter can be designed to only engage during abnormal or overload conditions.

The aforementioned embodiments of the strut provide one or more benefits over conventional strut design. For example, aircraft, helicopters and the like typically have very limited space for stowing deployable wheel systems and/or landing gear, and positioning deployable wheel systems to engage available space in the aircraft or other vehicle can be challenging. As such, the envelope for incorporating struts and shock absorbing features may limit the amount of energy storage and/or damping the struts are able to handle prior to component failure or aircraft damage.

Embodiments of the present disclosure disclosed herein, which include integrally formed first and second load limiters, address one or more problems in the prior art. In that regard, by employing, for example, disc springs in an integral manner, the static length of the strut can be maintained within 5-10% (or less) of a conventional oleo strut. Thus, the compact configurations of the strut allows the strut to be employed on both fixed and retractable landing gear alike, while providing design adjustability for obtaining load-deflection curves that accommodate a range of descent or impact velocities. Therefore, the struts of some embodiments provide a compact, weight efficient load limiter, which can be particularly suitable for use in retractable landing gear. Other benefits may be also realized, such as improved maintainability of the strut via employment of mechanical springs when compared to prior art gas stages that are prone to leakage, require more frequent servicing, etc.

In the description above, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An energy absorbing apparatus for an aircraft, the apparatus comprising:
    a first load limiter including an oleo-pneumatic strut configured to absorb impact energy exerted on said strut, wherein the oleo pneumatic strut comprises an inner cavity that contains a strut fluid composed of gas and hydraulic fluid, an orifice support tube located within the inner cavity and defining at least one damping orifice, a piston movable within the inner cavity in order to force the strut fluid through the at least one damping orifice, and an outer cylinder configured to slideably receive the piston therein, the inner cavity formed by the piston and the outer cylinder, wherein the orifice support tube is disposed within the outer cylinder and extends from a fixed end at a first end of the outer cylinder to a free end; and
    a second load limiter integrally formed within the oleo-pneumatic strut, wherein the second load limiter includes one or more disc springs configured to absorb impact energy exerted on said strut via compression of the one or more disc springs, wherein the one or more disc springs are positioned within the inner cavity and surround the orifice support tube adjacent the first end of the outer cylinder.

2. The apparatus according to claim 1, wherein the first load limiter is configured to absorb impact energy associated with normal operating conditions of the aircraft, and wherein the second load limiter is configured to absorb additional impact energy that exceeds the impact energy associated with normal operating conditions of the aircraft.

3. The apparatus according to claim 1, wherein the one or more disc springs includes a first set of disc springs positioned in the inner cavity and a second set of disc springs positioned in the inner cavity a spaced distance from the first set of disc springs.

4. The apparatus according to claim 1, wherein the oleo pneumatic strut further comprises a metering pin positioned in the piston, wherein the orifice support tube is arranged to slidably receive the metering pin through the at least one damping orifice.

5. The apparatus according to claim 4, wherein a plate is positioned to surround the orifice support tube to retain and be in contact with the one or more disc springs.

6. The apparatus according to claim 5, wherein the piston strikes the plate when the piston is moved a distance within the inner cavity.

7. A retractable landing gear comprising the apparatus according to claim 1.

8. The apparatus according to claim 1, wherein the at least one damping orifice is positioned at the free end of the orifice support tube.

9. The apparatus according to claim 1, wherein the piston is configured to slideably receive the orifice support tube when the piston moves relative to the outer cylinder.

10. The apparatus according to claim 9, wherein the oleo pneumatic strut further comprises a metering pin positioned within the piston, wherein the orifice support tube is arranged to slidably receive the metering pin through the at least one damping orifice.

\* \* \* \* \*